United States Patent [19]

Armstrong

[11] 4,222,263

[45] Sep. 16, 1980

[54] CRANKSHAFT POSITION TRANSDUCER SYSTEM

[75] Inventor: Clifford M. Armstrong, Leek Wootton, England

[73] Assignee: Lucas Industries Limited, Birmingham, England

[21] Appl. No.: 17,658

[22] Filed: Mar. 5, 1979

[30] Foreign Application Priority Data

Mar. 18, 1978 [GB] United Kingdom ............... 10821/78

[51] Int. Cl.$^3$ ............................................ G01M 15/00

[52] U.S. Cl. ...................................... 73/116; 310/168; 336/110

[58] Field of Search ...................... 73/116, 117.3, 115, 73/119 A; 336/30, 110, 221, 45; 310/168, 169, 170, 171

[56] References Cited

U.S. PATENT DOCUMENTS

| | | | |
|---|---|---|---|
| 3,389,599 | 6/1968 | Beale | 73/115 |
| 3,503,256 | 3/1970 | List et al. | 73/115 |
| 3,509,390 | 4/1970 | Loughlin et al. | 310/168 X |
| 3,623,467 | 11/1971 | Piteo | 123/149 D |
| 3,625,054 | 12/1971 | Vesper et al. | 73/115 |
| 3,753,429 | 8/1973 | Imhof et al. | 123/148 E |

FOREIGN PATENT DOCUMENTS

| | | |
|---|---|---|
| 2123016 | 1/1972 | France . |
| 2283425 | 3/1976 | France . |
| 946638 | 1/1964 | United Kingdom . |

*Primary Examiner*—Jerry W. Myracle
*Attorney, Agent, or Firm*—Ladas & Parry

[57] ABSTRACT

A crankshaft position transducer system for providing triggering pulses for an electronic ignition system comprising an internal combustion engine having a flywheel, a pair of reference elements mounted at circumferentially and radially spaced locations on the flywheel and a transducer head having two individual transducers. Each individual transducer co-operates with a respective one of the reference elements to produce a triggering pulse.

4 Claims, 2 Drawing Figures

CRANKSHAFT POSITION TRANSDUCER SYSTEM

The present invention relates to a crankshaft position transducer system for providing triggering pulses for an electronic ignition system.

In one type of electronic ignition system used with an internal combustion engine having a crankshaft and associated flywheel, it is required to produce a pair of triggering pulses corresponding to two rotational positions of the flywheel. In one known type of crankshaft position transducer system this is achieved by mounting a reference projection on the periphery of the flywheel and mounting a pair of transducer heads at circumferentially spaced positions on the flywheel housing for detecting the passage of the reference element. However, space in the region of the flywheel is limited and it is inconvenient to provide a pair of transducers.

It is accordingly an object of the present invention to provide a new or improved crankshaft position transducer system in which the above mentioned disadvantage is overcome or reduced.

According to the present invention there is provided a crankshaft position transducer system comprising an internalcombustion engine having a crankshaft, a rotary member mounted to rotate at a speed proportional to the speed of rotation of the crankshaft, at least one pair of reference elements mounted on the rotary member at radially and circumferentially spaced locations, and a transducer head including a pair of individual transducers, the transducer head being positioned and arranged so that each individual transducer co-operates with a respective one of the or each pair of reference elements to produce a triggering pulse at a predetermined rotational position of the rotary member.

By providing at least one pair of reference elements mounted at circumferentially and radially spaced locations and a transducer head including a pair of individual transducers, the system of the present invention will produce a pair of reference pulses and may be positioned where space is limited.

Preferably, there is a single pair of reference elements.

Figure 1:
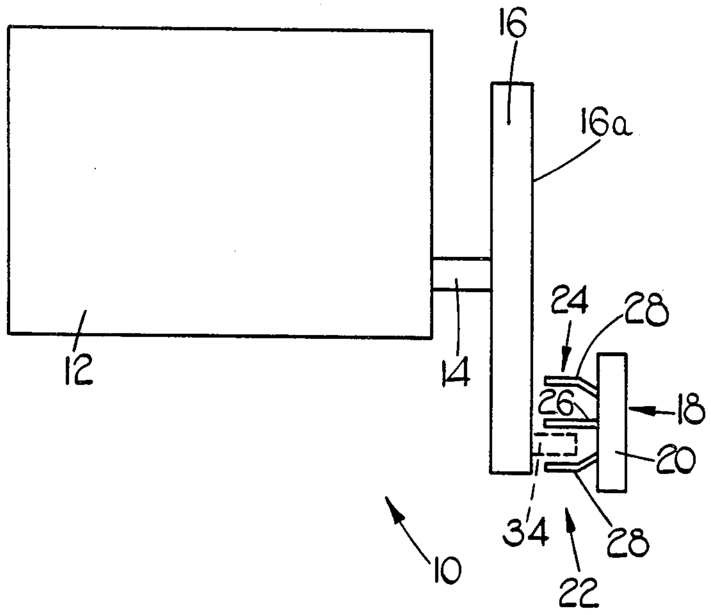
Figure 2:
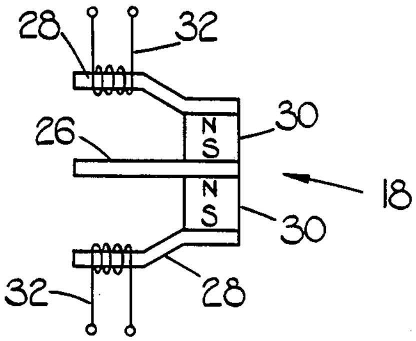

The present invention will now be described in more detail by way of example with reference to the accompanying drawings in which:

FIG. 1 is a diagram of a crankshaft position transducer system embodying the present invention, and FIG. 2 is a diagram of the transducer head of the system shown in FIG. 1.

Referring now to the drawings there is shown a crankshaft position transducer system 10 comprising a conventional spark ignition internal combustion engine 12 having a crankshaft 14 and a flywheel 16. A transducer head 18 is positioned adjacent to one of the faces

16a of the flywheel 16. The transducer head 18 comprises a body portion 20 which is fixed to the flywheel housing, not shown, and a pair of individual transducers 22,24 of the variable reluctance type. Each of the transducers 22,24 comprises a central pole 26, common to both transducers, and an outer pole 28. As shown in FIG. 2 the two pole pieces of each transducer are provided with magneto-motive force by a permanent magnet 30, positioned inside the body portion 20, and each transducer also includes a pick-up coil 32. The pick-up coils 32 are connected to an electronic ignition system forming no part of the present invention.

Associated with each of the transducers 22, 24 is a reference element in the form of an axial projection of cylindrical shape fixed to the face 16a of the flywheel 16, one of which is indicated by the chain dotted line 34. The axial projections are radially spaced from each other and each axial projection is arranged to pass between the pole pieces 26, 28 of its associated transducer. The axial projections are also circumferentially spaced from each other, in the present example by 60°, and their circumferential positions correspond to the maximum and minimum advance positions for each spark to be produced by the electronic ignition system.

In operation, when the flywheel 16 rotates, the pickup coil 32 of each transducer produces a triggering pulse each time its associated axial projection passes between its pole piece 26, 28, thereby producing a pair of pulses for each complete rotation of the flywheel.

The crankshaft position transducer system described hereinbefore is tolerant of large variations in the axial position of the axial projections as may be encountered when it is installed in a motor vehicle equipped with automatic transmission.

I claim:

1. A crankshaft position transducer system comprising an internal combustion engine having a crankshaft, a rotary member mounted to rotate at a speed proportional to the speed of rotation of the crankshaft, at least one pair of refrence elements mounted on the rotary member at radially and circumferentially spaced locations, and a transducer head including a pair of individual transducers, the transducer head being positioned and arranged so that each individual transducer cooperates with a respective one of the or each pair of reference elements to produce a triggering pulse at a predetermined rotational position of the rotary member.

2. A system as claimed in claim 1 in which there is a single pair of reference elements.

3. A system as claimed in claim 1 or claim 2, in which the rotary member comprises a flywheel mounted on the crankshaft.

4. A system as claimed in claim 1 or claim 2, characterised in that each individual transducer comprises a variable reluctance transducer.

* * * * *